United States Patent

[11] 3,581,005

[72] Inventor John Fulton
Brookfield, Ill.
[21] Appl. No. 831,516
[22] Filed June 9, 1969
[45] Patented May 25, 1971
[73] Assignee Extel Corporation
Chicago, Ill.

[54] DELAYED ACTION TAPE FAILURE CONTROL FOR HIGH-SPEED TAPE PRINTER
4 Claims, 5 Drawing Figs.

[52] U.S. Cl. .......... 178/42
[51] Int. Cl. .......... H041 13/06
[50] Field of Search .......... 178/42

[56] References Cited
UNITED STATES PATENTS
2,836,653 5/1958 Kolpek .......... 178/42X

*Primary Examiner*—William C. Cooper
*Assistant Examiner*—Thomas W. Brown
*Attorney*—Kinzer, Dorn & Zickert

ABSTRACT: A delayed action tape failure control for a high-speed tape printer, tape punch, or like machine actuated by recurring pulse signals, comprising a NAND gate and a NOR gate connected to the count and reset inputs, respectively, of a binary counter; the print pulse signals are applied to one input of each gate and a tape presence detector switch, located ahead of the print or punch mechanism, is connected to the other input of each gate. As long as tape is present, the counter is maintained in cleared condition and machine operation continues; when tape is absent, the counter counts print pulses and machine operation is interrupted when a given count is reached.

PATENTED MAY 25 1971 3,581,005

COUNTER 31

| DECIMAL COUNT | OUT PUT | | | |
|---|---|---|---|---|
| | 48 | 44 | 42 | 41 |
| 0 | O | O | O | O |
| 1 | O | O | O | + |
| 2 | O | O | + | O |
| 3 | O | O | + | + |
| 4 | O | + | O | O |
| 5 | O | + | O | + |
| 6 | O | + | + | O |
| 7 | O | + | + | + |
| 8 | + | O | O | O |
| 9 | + | O | O | + |
| 10 | + | O | + | O |
| 11 | + | O | + | + |
| 12 | + | + | O | O |
| 13 | + | + | O | + |
| 14 | + | + | + | O |
| 15 | + | + | + | + |

GATE 34

| IN 51 | IN 52 | OUT |
|---|---|---|
| + | + | O |
| + | O | + |
| O | + | + |
| O | O | + |

GATE 35

| IN 53 | IN 54 | OUT |
|---|---|---|
| O | O | + |
| O | + | O |
| + | O | O |
| + | + | O |

INVENTOR.
JOHN FULTON

BY Kinzer, Dorn & Zickert
Attys.

DELAYED ACTION TAPE FAILURE CONTROL FOR HIGH-SPEED TAPE PRINTER

BACKGROUND OF THE INVENTION

In high-speed tape printers of the kind used for telegraphy and similar applications, and in other like machines such as high-speed tape punches, operation must be interrupted upon occurrence of a break in the tape or when the tape supply is exhausted. Of course, on a machine under the direct control and supervision of an operator, the problem is minimized because a tape break or the runout of a tape roll is readily detected. But machines of this kind may be operated with no one in immediate attendance. Consequently, if the tape breaks or if the tape supply runs out, considerable information may be lost. Moreover, it may be difficult to determine when the tape loss occurred.

In some machines, this difficulty has been overcome, in part, by a device for continuously detecting the presence of the tape fed to the printer, punch, or other operating mechanism of the machine. This tape presence detector may comprise a sensing switch located along the path of tape movement adjacent the operating mechanism, with some means for stopping the machine when a tape break is detected, but an arrangement of this kind is not entirely satisfactory. If the sensing switch or other tape detector malfunctions, for even a brief period, the machine may be stopped when an adequate supply of tape is actually available. Furthermore, the machine operation may be interrupted when there is still tape enough to complete the recording of at least one more data item that is otherwise lost.

SUMMARY OF THE INVENTION

It is a principal object of the present invention, therefore, to provide a new and improved tape failure control for a high-speed tape printer, tape punch, or like machine which effectively and inherently overcomes the disadvantages of previously known devices of his kind.

A specific object of the invention is to provide a new and improved tape failure control for a high-speed tape printer or like machine that can tolerate substantial errors on the part of a tape presence detector without shutting down the machine unnecessarily.

Another object of the invention is to provide a new and improved tape failure control that can be used in a wide variety of high-speed tape printers, tape punches, or like machines without requiring substantial modification, being adaptable to the needs of an individual machine with little or no change in the basic control structure.

A tape failure control for a high-speed tape printer or like machine having an operating mechanism actuated by recurring print pulse signals, constructed in accordance with the present invention, comprises a counter having a count input, a clear input, and at least one output. The control includes a first gate having two inputs and having an output connected to the count input of the counter and a second gate having two inputs and an output connected to the clear input of the counter; the print palse signals are applied to one input of each of these gates. A tape presence detector is connected to the other input of each of the gates and applies a tape presence signal to each of the gates to enable the second gate and block the first gate when tape is present in the machine and to enable the first gate and block the second gate when tape is absent. An inhibit circuit is connected to the output of the counter and is employed to interrupt operation of the operating mechanism of the machine whenever the counter reaches or exceeds a given count.

Other and further objects of the present invention will be apparent from the following description and claims and are illustrated in the accompanying drawings which, by way of illustration, show a preferred embodiment of the present invention and the principles thereof and what is now considered to be the best mode contemplated for applying these principles. Other embodiments of the invention embodying the same or equivalent principles may be made as desired by those skilled in the art without departing from the present invention.

DESCRIPTION OF THE PREFERRED EMBODIMENT

Figures 1, 2, 3, 4, 5:
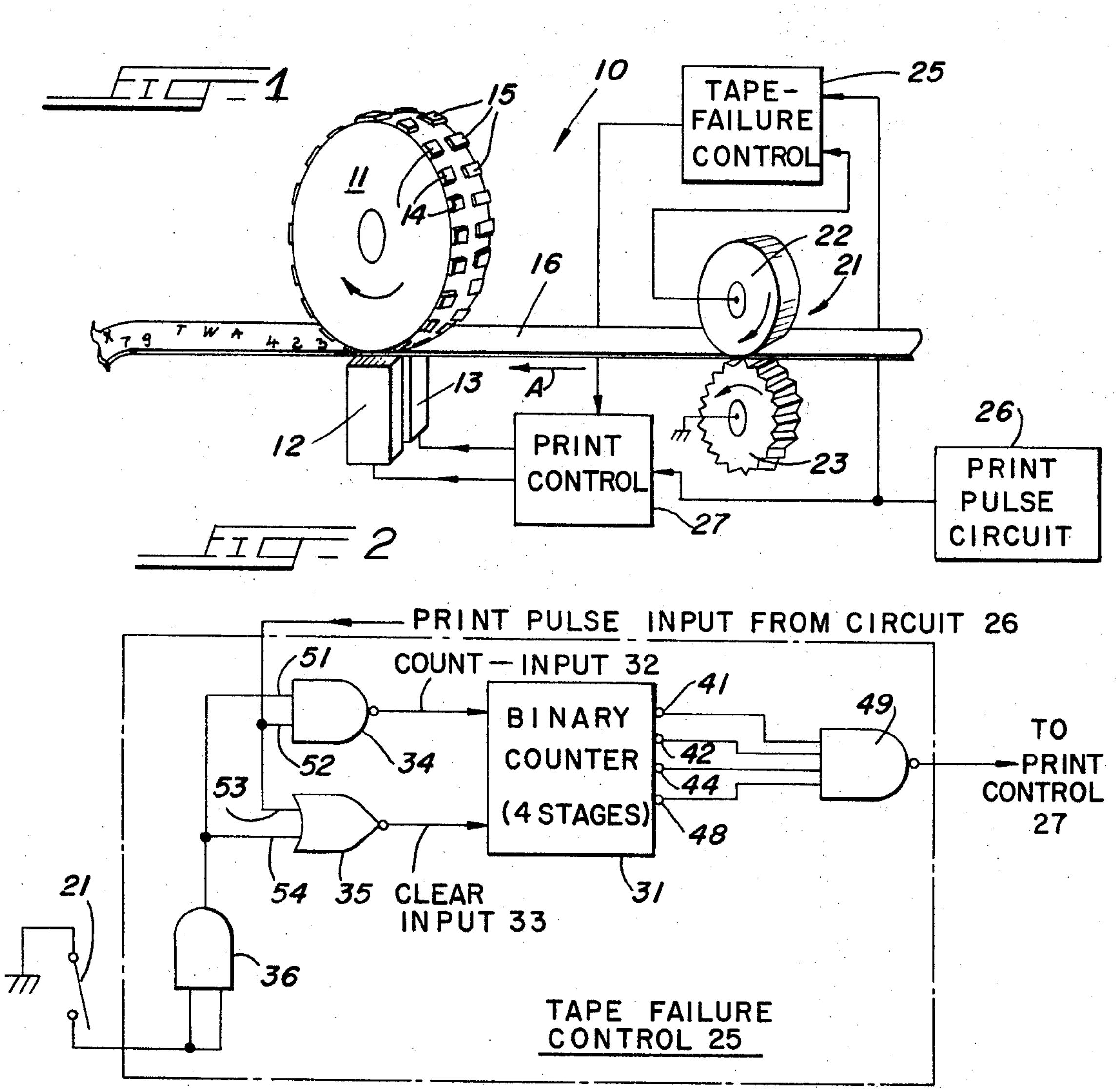
FIG. 1 is a simplified elevation view of a high-speed tape printer incorporating a tape failure control.
FIG. 2 is a schematic diagram of a tape failure control constructed in accordance with the present invention.
FIGS. 3, 4 and 5 are operating tables for three of the circuits incorporated in the control illustrated in FIG. 2.

FIG. 1 illustrates a high-speed tape printer 10 comprising a continuously rotating type wheel 11 aligned with a pair of electrically actuated print hammers 12 and 13. Type wheel 11 is of a kind used in printing stock market quotations and comprises a first row of type characters 14 aligned with print hammer 12 and a second row of type characters 15 aligned with print hammer 13. The type characters or row 14 are numeric and special characters, those of row 15 being alphabetic characters.

A paper tape 16 extends between type wheel 11 and hammers 12 and 13 and is driven from right to left through the gap between the type wheel and the print hammers, during operation, as indicated by arrow A. A tape presence detector and tape feed mechanism 21 is located ahead of type wheel 11 on the path of tape 16. In the simple form illustrated in FIG. 1, the tape presence detector 21 comprises a pressure roll 22 aligned with a serrated feed roll 23, the tape 16 passing between rolls 22 and 23 as it moves toward type wheel 11. Feed roll 23 is electrically connected to a plane of known potential, here shown as system ground. Rolls 22 and 23 are electrically conductive and are mechanically biased toward engagement with each other; thus, they afford a switch that is maintained open as long as tape 16 is present between the rolls and that is closed in the absence of tape. A step drive (not illustrated) is provided to rotate feed roll 23 through a predetermined incremental arc in a counterclockwise direction, in each printing cycle, to feed the tape to the type wheel in equal increments each corresponding to the tape length required for one character space.

Roll 22 in tape feed and detector unit 21 is electrically connected to one input of a tape failure control 25. Tape failure control 25 also has a second input that is supplied with print pulse signals from a print pulse circuit 26. The print pulse signals from circuit 26 are also supplied to a print control circuit 27 that selectively actuates hammers 12 and 13 in the course of the printing operation. The output of tape failure control 25 is connected to print control circuit 27 to inhibit the printing operation under certain conditions for tape 16 as described more fully hereinafter.

Tape failure control 25 is illustrated in FIG. 2. It comprises a four stage binary counter 21 having a count input 32 and a clear or reset input 33. The tape failure control 25 includes a NANd gate 34 having two inputs 51, 52 and having an output that is connected to the count input 32 of counter 31. A NOR gate 35, having two inputs 53, 54, is incroporated in the tape failure control with its output connected to the clear input 33 of counter 31.

In control 25, the print pulse signals from circuit 26 are applied to inputs 52 and 53 of gates 34 and 35, respectively. The remaining inputs 51 and 54 of these two gates are each connected to the output of a NAND gate 36. Gate 36 functions primarily as a signal inversion circuit, both of the inputs to gate 36 being connected to the tape presence detector switch 21. Thus, the tape presence detector switch is connected, through the inverter gate 36, to one input of each of gates 34 and 35 to apply a tape presence signal to each of gates 34 and 35.

Binary counter 31, in the circuit illustrated in FIG. 2, is a four stage counter having individual outputs 41, 42, 44 and 48. The four counter outputs are electrically connected to individual inputs of a NAND gate 49. The output of gate 49 is connected to print control circuit 27. Gate 49 constitutes an inhibit circuit for interrupting operation of the printing machine under certain operating conditions, as described hereinafter.

FIG. 3 is a "truth" table illustrating the operation for gate 34. In the table, a positive-going signal, referred to herein as a "high" signal, is indicated by a "+" symbol. A ground or negative-going signal, referred to herein as a "low" signal, is indicated by a "0" symbol. It should be understood that the selection of symbols in relation to polarity is quiet arbitrary and that all polarities in the circuits can be reversed, depending upon the choice of the designer as to the polarities representing true and false values.

From FIG. 3, it is apparent that gate 34 produces a low signal only when both of the inputs 51 and 52 for this gate receive high signals. From FIG. 4, which is a corresponding operating table for gate 35, it can be seen that gate 35 produces a low signal whenever the signal on either one or both of its inputs 53 and 54 is a high signal. This is significant because the binary counter 31 is constructed to operate on the basis of low input signals. If the counter were constructed to operate from high input signals, the connections from gates 34 and 35 to counter inputs 32 and 33 would be reversed.

FIG. 5 generally illustrates the operation of counter 31 and indicates the output signals available at output circuit 41, 42, 44 and 48 for various counts in the counter. The significance of the table of FIG. 5 is apparent when it is understood that NAND circuit 49 must receive a high input signal on each of its input circuits in order to supply an inhibit signal to print control 27.

During operation of printer 10, FIG. 1, circuit 26 generates a print pulse signal for each character to be imprinted by type wheel 11. The print pulses are utilized to actuate print hammers 12 and 13, under control of circuit 27, to imprint a series of characters on tape 16. The timing of the operation of hammers 12 and 13 varies, depending upon the angular orientation of the type wheel and its rate of rotation. The print pulses also control rotation of tape feed roll 23, which advances tape 16 by an increment equal to one type character space following each printing operation. As long as tape is present between rollers 22 and 23, the printing operation goes forward in this manner without interruption.

During normal operation, with tape 16 interposed between the rollers 22 and 23 of the tape presence detector switch 21, the output signal from inverter gate 36 is a low signal. This signal, supplied to input 51 of gate 34, maintains gate 34 in blocked condition so that the incoming print pulses from circuit 26 that are applied to input 52 of gate 34 cannot be passed on to count input 32 of counter 31. But the low signal supplied to input 54 of gate 35 enables gate 35; consequently, the print pulse signals applied to input 53 of gate 35 are supplied, as low input signals to the clear input 33 of counter 31. Consequently, counter 31 is maintained in a cleared condition at all times, during normal operation with low signals on each of the output circuits 41, 42, 44 and 48 of the counter (see FIG. 5 for the effect of a zero count in the counter). Under these circumstances, the output from gate 49 is a high signal which does not inhibit operation of print control 27 and which allows the printing operation to continue.

If tape 16 breaks or if the supply of tape runs out, rollers 22 and 23 contact each other, effectively closing the tape presence detector switch 21. If the tape becomes jammed, feed roll 23 rapidly wears through the tape and contacts roll 22. Under these circumstances, the operations of gates 34 and 35 are reversed. Thus, the resulting high output signal from inverter gate 36 now blocks gate 35, so that the incoming print pulse signals from circuit 26 that are supplied to gate 35 cannot be passed to the clearing input 33 of counter 31. On the other hand, the high output signal from gate 36 serves as an enabling signal to gate 34 so that each print pulse is now supplied to the count input 33 of binary counter 31. Each print pulse adds to the total count in the counter. After a predetermined number of pulses, in this instance 15, have been supplied to counter 31, all four of the counter outputs 41, 42, 44 and 47 supply positive-going or high input signals to gate 49 (see FIG. 5, last line). Under these circumstances, gate 49 produces a low output signal that constitutes an inhibit signal supplied to print control 27. The inhibit signal is utilized by print control circuit 27 to interrupt operation of printing machine 10.

As soon as a new tape is installed, again opening presence detector switch 21, the first print pulse supplied to tape failure control 25 is passed through gate 35 to counter 31, resetting all stages of the counter. This immediately restores the tape failure control to a condition in which its output signal permits operation of the printing machine.

A number of different factors may affect the desired number of print pulses to be counted in counter 31 before machine operation is interrupted. The count should be more than one or two such pulses, because the tape presence detector switch 21 may malfunction in the event of any minor holes, tears, or other imperfections in tape 16. If there is a substantial space between type wheel 11 and the tape presence detector, and the tape presence detector is located on the input side of the type wheel, a relatively long count may be desirable to permit the printing machine to complete recording of a complete data item, with the remainder of the tape available, before the machine is shut down. If the length of tape between tape presence detector 21 and type wheel 11 is more than 15 character spaces, additional stages may be required in counter 31. If the intervening tape length is shorter than 15 character spaces, a counter of three stages may be sufficient. The number of pulses required to actuate gate 49 and produce an effective inhibit signal can be varied by using a counter capacity equivalent to the delay desired. This is the only portion of tape failure control 25 that requires modification in order to function with a wide variety of different high-speed tape printers, tape punches, and like machines.

I claim:

1. A tape failure control for a high-speed tape printer or like machine having an operating mechanism actuated by recurring print pulse signals, comprising:

a counter having a count input, a clear input, and at least one output;

a first gate having two inputs and having an output connected to the count input of the counter;

a second gate having two inputs and having an output connected to the clear input of the counter;

means for applying said print pulse signals to one input of each of said gates;

a tape presence detector, connected to the other input of each of said gates, for applying a tape presence signal to each of said gates to enable said second gate and block said first gate when tape is present in the machine and to enable said first gate and block said second gate when tape is absent;

and an inhibit circuit, connected to the output of said counter, for interrupting operation of the operating mechanism whenever said counter reaches or exceeds a given count.

2. A tape failure control for a high-speed tape printer or like machine, according to claim 1, in which said tape presence detector is a switch located on the path of tape movement adjacent said operating mechanism and actuated between open and closed positions by the tape.

3. A tape failure control for a high-speed tape printer or like machine, according to claim 2, in which said switch comprises two conductive members normally separated from each other by the tape but biased toward each other to engage and close the switch when no tape is present.

4. A tape failure control for a high-speed tape printer or like machine, according to claim 1, in which said counter is a multistage binary counter having a plurality of outputs, one for each stage, and said inhibit circuit comprises a third gate having a plurality of inputs each connectable to one output of said counter.